United States Patent Office 3,068,301
Patented Dec. 11, 1962

3,068,301
ALKYLATION OF AROMATIC HYDROCARBONS
George L. Hervert, Downers Grove, and Carl B. Linn, Riverside, Ill., assignors to Universal Oil Products Company, Des Plaines, Ill., a corporation of Delaware
No Drawing. Filed Oct. 15, 1959, Ser. No. 846,541
5 Claims. (Cl. 260—671)

This application is a continuation-in-part of copending application Serial No. 722,121, filed March 18, 1958, now Patent No. 2,939,890, June 7, 1960.

This invention relates to a process for the alkylation of aromatic hydrocarbons, and more particularly relates to a process for the alkylation of aromatic hydrocarbons with olefin-acting compounds in the presence of a catalyst comprising a boron trifluoride modified substantially anhydrous silica-alumina. Still more particularly, this invention relates to a process fo rthe alkylation of benzene hydrocarbons with olefin-acting compounds in the presence of a catalyst comprising boron trifluoride and boron trifluoride modified substantially anhydrous silica-alumina.

An object of this invention is to produce alkylated aromatic hydrocarbons, and more particularly to produce alkylated benzene hydrocarbons. A specific object of this invention is to produce ethylbenzene, a desired chemical intermediate, which is utilized in large quantities in dehydrogenation processes for the manufacture of styrene, one starting material in the production of some synthetic rubbers. Another specific object of this invention is a process for the production of cumene by the reaction of benzene with propylene, which cumene product may be oxidized to form cumene hydroperoxide, which latter compound is readily decomposed into phenol and acetone. Another object of this invention is the production of para-diisopropylbenzene, which diisopropylbenzene product is oxidized to terephthalic acid, one starting material for the production of some synthetic fibers. A further specific object of this invention is to produce alkylated aromatic hydrocarbons boiling within the gasoline boiling range having high anti-knock value and which may be used as such or as components of gasoline suitable for use in automobile engines. Still another object of this invention is the alklation of aromatic hydrocarbons with so-called refinery off-gases or dilute olefin streams, said olefin-containing streams having olefin concentrations in quantities so low that such streams have not been utilized satisfactorily as alkylating agents in existing processes without prior intermediate olefin concentration steps. This and other objects of the invention will be set forth hereinafter in detail as part of the accompanying specification.

Previously, it has been suggested that boron trifluoride can be utilized as a catalyst for the alkylation of aromatic hydrocarbons with unsaturated hydrocarbons. For example, Hofmann and Wulff succeeded in replacing aluminum chloride by boron trifluoride for catalysis of condensation reactions of the Friedel-Crafts type; (German Patent 513,414 and British Patent 307,802). Aromatic hydrocarbons such as benzene, toluene, tetralin, and naphthalene have been condensed with ethylene, propylene, isononylene, and cyclohexene in the presence of boron trifluoride with the production of the corresponding mono- and polyalkylated aromatic hydrocarbon derivatives. In these processes rather massive amounts of boron trifluoride have been utilized as the catalyst. Similarly, the olefin utilized has been pure or substantially pure. No successful processes have yet been introduced in which the olefin content of a gas stream, which is rather dilute in olefins, has been successfully consumed to completion in the absence of some olefin concentration step or steps. By the use of the process of the present invention, such gas streams may be utilized per se as alkylating agents along with minor amounts of boron trifluoride and substantially complete conversions of the olefin content are obtained.

One embodiment of this invention relates to a process for the production of an alkylaromatic hydrocarbon which comprises passing to an alkylation zone containing a boron trifluoride modified substantially anhydrous silica-alumina, alkylatable aromatic hydrocarbon, olefin-acting compound, and not more than 2.5 grams of boron trifluoride per gram mol of olefin-acting compound, reacting therein said alkylatable aromatic hydrocarbon with said olefin-acting compound at alkylation conditions in the presence of an alkylation catalyst comprising said boron trifluoride modified substantially anhydrous silica-alumina, and recovering therefrom alkylated aromatic hydrocarbon.

Another embodiment of this invention relates to a process for the production of an alkylbenzene hydrocarbon which comprises passing to an alkylation zone containing boron trifluoride modified substantially anhydrous silica-alumina, alkylatable benzene hydrocarbon, olefin, and not more than 2.5 grams of boron trifluoride per gram mol of olefin, reacting therein said alkylatable benzene hydrocarbon with said olefin at alkylation conditions in the presence of an alkylation catalyst comprising said boron trifluoride modified substantially anhydrous silica-alumina, and recovering therefrom alkylated benzene hydrocarbon.

A specific embodiment of this invention relates to a process for the production of ethylbenzene which comprises passing to an alkylation zone containing boron trifluoride modified substantially anhydrous silica-alumina, benzene, ethylene, and from about 0.001 gram to about 2.5 grams of boron trifluoride per gram mol of ethylene, reacting therein said benzene with said ethylene at alkylation conditions including a temperature of from about 0° to about 300° C. and a pressure of from about atmospheric to about 200 atmospheres in the presence of an alkylation catalyst comprising said boron trifluoride and boron trifluoride modified substantially anhydrous silica-alumina, and recovering therefrom ethylbenzene.

A still further specific embodiment of this invention relates to a process for the production of cumene which comprises passing to an alkylation zone containing boron trifluoride modified substantially anhydrous silica-alumina, benzene, propylene, and from about 0.001 gram to about 2.5 grams of boron trifluoride per gram mol of propylene, reacting therein said benzene with said propylene at alkylation conditions including a temperature of from about 0° to about 300° C. and a pressure of from about atmospheric to about 200 atmospheres in the presence of an alkylation catalyst comprising said boron trifluoride and boron trifluoride modified substantially anhydrous silica-alumina, and recovering therefrom cumene.

We have found, when utilizing a catalyst comprising a boron trifluoride modified substantially anhydrous silica-alumina, that the alkylation of aromatic hydrocarbons with olefin-acting compounds is surprisingly easy when boron trifluoride is supplied in a quantity not greater than 2.5 grams of boron trifluoride per gram mol of olefin-acting compound. The quantity of boron trifluoride utilized may be appreciably less than 2.5 grams per gram mol of olefin-acting compound and conversion of the olefin-acting compound to alkylaromatic hydrocarbon still observed. When the quantity of boron trifluoride utilized is greater than about 2.5 grams per gram mol of olefin-acting compound, side reactions begin to take place which convert the olefin-acting compound to other than the desired alkylaromatic hydrocarbon. With introduction of the boron trifluoride into the reaction zone in an amount within the range of 0.001 gram to 2.5 grams per gram mol of olefin-acting compound, substantially complete conversion of the olefin-acting compound is obtained to produce desired alkylaromatic hydrocarbons, even when the olefin-acting compound is present as a so-called diluent in a gas stream the other components of which are inert under the reaction conditions and which other components decrease the partial pressure of the olefin present in the alkylation reaction zone. Furthermore, we have found that the use of a boron trifluoride modified substantially anhydrous silica-alumina along with the limited quantities of boron trifluoride hereinabove described results in the attainment of completeness of reaction which has not been possible prior to this time. Furthermore, when the boron trifluoride modified substantially anhydrous silica-alumina is present in the alkylation reaction zone, it has been found that the boron trifluoride may be added continuously, intermittently, or in some cases addition may be stopped, provided, of course, that the boron trifluoride added was never greater than 2.5 grams per gram mol of olefin-acting compound. Thus, the process may be started with boron trifluoride addition, for example, within the above set forth ranges, and the boron trifluoride addition discontinued. Depending upon whether or not the boron trifluoride modified substantially anhydrous silica-alumina retains its activity, it may or may not be necessary to add further quantities of boron trifluoride within the above set forth ranges. This feature of the process of the present invention will be set forth more fully hereinafter.

Boron trifluoride is a gas (B.P. $-101°$ C., M.P. $-126°$ C.) which is readily soluble in most organic solvents. It may be utilized per se by merely bubbling into a reaction mixture or it may be utilized as a solution of the gas in an organic solvent such as the aromatic hydrocarbon to be alkylated, for example, benzene. Such solutions are within the generally broad scope of the use of a boron trifluoride catalyst in the process of the present invention although not necessarily with equivalent results. Gaseous boron trifluoride is preferred.

The preferred catalyst composition, as stated hereinabove, comprises boron trifluoride and boron trifluoride modified substantially anhydrous but not completely dry silica-alumina. Substantially anhydrous but not completely dry silica-alumina means calcined silica-alumina which, on an anhydrous basis, contains from about one-tenth to about 10% water in chemical or physical association therewith. The amount of silica in such silica-alumina composites may range from about five to about ninety-five percent by weight. The silica-alumina composites may be prepared by any of the many well known techniques including precipitation, impregnation, coprecipitation, etc. In any case, it will be dried and then calcined at high temperature prior to boron trifluoride modification thereof. The exact reason for the specific utility of the silica-alumina in the process of this invention is not fully understood but it is believed to be connected with the number of residual hydroxyl groups on the surface of the particular crystalline silica-alumina. Modification of silica-alumina with boron trifluoride may be carried out prior to the addition of the silica-alumina to the alkylation reaction zone or this modification may be carried out in situ. Furthermore, this modification of the silica-alumina with boron trifluoride may be carried out prior to contact of the boron trifluoride modified silica-alumina with the aromatic hydrocarbon to be alkylated and the olefin-acting compound, or the modification may be carried out in the presence of the aromatic hydrocarbon to be alkylated, or in the presence of both the aromatic hydrocarbon to be alkylated and the olefin-acting compound. Obviously there is some limitation upon this last mentioned method of silica-alumina modification. The modification of the above mentioned silica-alumina with boron trifluoride is an exothermic reaction and care must be taken to provide for proper removal of the resultant heat.

The modification of the silica-alumina is carried out by contacting the silica-alumina with from about 2% to about 100% by weight boron trifluoride based on the silica-alumina. In one manner of operation, the silica-alumina is placed as a fixed bed in a reaction zone, which may be the alkylation reaction zone, and the desired quantity of boron trifluoride is passed therethrough. In such a case, the boron trifluoride may be utilized in so-called massive amounts or may be used in dilute form diluted with various other gases such as hydrogen, nitrogen, helium, etc. This contacting is normally carried out at room temperature although temperatures up to that to be utilized for the alkylation reaction, that is, temperatures up to about 300° C. may be used. With the preselected silica-alumina at room temperature, utilizing boron trifluoride alone, a temperature wave will travel through the silica-alumina bed during this modification of the silica-alumina with boron trifluoride, increasing the temperature of the silica-alumina from room temperature up to about 100° C. or more. As the boron trifluoride content of the gases to be passed over the silica-alumina is diminished, this temperature increase also diminishes and can be controlled more readily in such instances. In another method for the modification of the above mentioned silica-alumina with boron trifluoride, the silica-alumina may be placed as a fixed bed in the alkylation reaction zone, the boron trifluoride dissolved in the aromatic hydrocarbon to be alkylated, and the solution of aromatic hydrocarbon and boron trifluoride passed over the silica-alumina at the desired temperature until sufficient boron trifluoride has modified the silica-alumina. When the gas phase treatment of the silica-alumina is carried out, it is noted that no boron trifluoride passes through the silica-alumina bed until all of the silica-alumina has been modified by the boron trifluoride. This same phenomena is observed during the modification of the silica-alumina with the aromatic hydrocarbon solutions containing boron trifluoride. In another method, the modification of the silica-alumina can be accomplished by utilization of a mixture of aromatic hydrocarbon to be alkylated, olefin-acting compound, and boron trifluoride which upon passage over the silica-alumina forms the desired boron trifluoride modified silica-alumina in situ. In the latter case, of course, the activity of the system is low initially and increases as the complete modification of the silica-alumina with the boron trifluoride takes place. The exact manner by which the boron trifluoride modifies the silica-alumina is not understood. It may be that the modification is a result of complexing of the boron trifluoride with the silica-alumina, or on the other hand, it may be that the boron trifluoride reacts with residual hydroxyl groups on the silica-alumina surface. It has been found at any particular preselected temperature for treatment of substantially anhydrous silica-alumina, that the fluorine content of the treated silica-alumina attains a maximum which is not increased by further passage of boron trifluoride over the same. This maximum fluorine or boron trifluoride content of the silica-alumina increases with temperature and depends upon the specific silica-alumina selected. As stated hereinabove, the silica-alumina treatment is, in the preferred embodiment, carried out at a temperature equal to or just greater than the selected reaction temperature so that the silica-alumina will not necessarily tend to be modified further by the boron trifluoride which may be added in amounts not more than 2.5 grams per gram mol of olefin-acting compound during the process and so that control of the aromatic hydrocarbon alkylation reaction is attained more readily. In any case, the silica-alumina resulting from any of the above mentioned boron trifluoride treatments is referred to herein in the specification and claims as boron trifluoride modified substantially anhydrous silica-alumina.

This boron trifluoride modified silica-alumina is utilized, as set forth hereinabove, along with not more than 2.5 grams of boron trifluoride per gram mol of olefin-acting compound. When the quantity of boron trifluoride modified silica-alumina, along with boron trifluoride, is that needed for catalysis of the herein described reaction, the reaction takes place readily. When the desired reaction has been completed, the recovered boron trifluoride modified silica-alumina is free flowing and changed solely from its original transparent appearance to a very light yellow color. Of course, the silica-alumina contains quantities of boron and fluorine by analysis corresponding to that which will complex or react with the silica-alumina in the manner described hereinabove under the temperature conditions utilized for the reaction.

As set forth hereinabove, the present invention relates to a process for the alkylation of an alkylatable aromatic hydrocarbon with an olefin-acting compound in the presence of a catalyst comprising a boron trifluoride modified substantially anhydrous silica-alumina, and particularly in the presence of a catalyst comprising not more than 2.5 grams of boron trifluoride per gram mol of olefin-acting compound and a boron trifluoride modified substantially anhydrous silica-alumina. Many aromatic hydrocarbons are utilizable as starting materials in the process of this invention. Preferred aromatic hydrocarbons are monocyclic aromatic hydrocarbons, that is, benzene hydrocarbons. Suitable aromatic hydrocarbons include benzene, toluene, ortho-xylene, meta-xylene, para-xylene, ethylbenzene, ortho-ethyltoluene, meta-ethyltoluene, para-ethyltoluene, 1,2,3-trimethylbenzene, 1,2,4-trimethylbenzene, 1,3,5-trimethylbenzene or mesitylene, normal-propylbenzene, iso-propylbenzene, etc. Higher molecular weight alkylaromatic hydrocarbons are also suitable as starting materials and include aromatic hydrocarbons such as are produced by the alkylation of aromatic hydrocarbons with olefin polymers. Such products are frequently referred to in the art as alkylate, and include hexylbenzene, nonylbenzene, dodecylbenzene, pentadecylbenzene, hexyltoluene, nonyltoluene, dodecyltoluene, pentadecyltoluene, etc. Very often alkylate is obtained as a high boiling fraction in which the alkyl group attached to the aromatic nucleus varies in size from about $C_9$ to about $C_{18}$. Other suitable alkylatable aromatic hydrocarbons include those with two or more aryl groups such as diphenyl, diphenylmethane, triphenyl, triphenylmethane, fluorene, stilbene, etc. Examples of other alkylatable aromatic hydrocarbons within the scope of this invention as starting materials containing condensed benzene rings include naphthalene, alpha-methylnaphthalene, beta-methylnaphthalene, anthracene, phenanthrene, naphthacene, rubrene, etc. Furthermore, certain petroleum derived aromatic hydrocarbon containing gasoline, naphtha, etc. fractions also may be utilized. Of the above alkylatable aromatic hydrocarbons for use as starting materials in the process of this invention, the benzene hydrocarbons are preferred, and of the preferred benzene hydrocarbons, benzene itself is particularly preferred.

Suitable olefin-acting compounds or alkylating agents which may be charged in the process of this invention include monoolefins, diolefins, polyolefins, acetylenic hydrocarbons, and also alkyl chlorides, alkyl bromides, and alkyl iodides. The preferred olefin-acting compounds are olefinic hydrocarbons which comprise monoolefins having one double bond per molecule and polyolefins which have more than one double bond per molecule. Monoolefins which may be utilized as olefin-acting compounds or alkylating agents for alkylating alkylatable aromatic hydrocarbons in the presence of the hereinabove described catalyst are either normally gaseous or normally liquid and include ethylene, propylyene, 1-butene, 2-butene, isobutylene, and high normally liquid olefins such as pentenes, hexenes, heptenes, octenes, and higher molecular weight liquid olefins, the latter including various olefin polymers having from about 6 to about 18 carbon atoms per molecule such as propylene trimer, propylene tetramer, propylene pentamer, isobutylene dimer, isobutylene trimer, isobutylene tetramer, etc. Cycloolefins such as cyclopentene, methylcyclopentene, cyclohexene, methylcyclohexene, may be utilized, but generally not under the same conditions of operation applying to non-cyclic olefins. The polyolefinic hydrocarbons utilizable in the process of this invention include conjugated diolefins such as butadiene and isoprene, as well as non-conjugated diolefins and other polyolefinic hydrocarbons containing two or more double bonds per molecule. Acetylene and homologs thereof are also useful olefin-acting compounds.

As stated hereinabove, alkylation of the above alkylatable aromatic hydrocarbons may also be effected in the presence of the hereinabove referred to catalyst by reacting aromatic hydrocarbons with certain substances capable of producing olefinic hydrocarbons, or intermediates thereof, under the conditions of operation chosen for the process. Typical olefin producing substances capable of use include alkyl chlorides, alkyl bromides, and alkyl iodides capable of undergoing dehydrohalogenation to form olefinic hydrocarbons and thus containing at least two carbon atoms per molecule. Examples of such alkyl halides include ethyl chloride, normal-propyl chloride, iso-propyl chloride, normal-butyl chloride, iso-butyl chloride, secondary-butyl chloride, teriary-butyl chloride, amyl chlorides, hexyl chlorides, etc., ethyl bromide, normal-propyl bromide, iso-propyl bromide, normal-butyl bromide, iso-butyl bromide, secondary-butyl bromide, tertiary-butyl bromide, amyl bromides, hexyl bromides, etc., ethyl iodide, normal-propyl iodide, etc.

As stated hereinabove, olefin hydrocarbons, especially normally gaseous olefin hydrocarbons, are particularly preferred olefin-acting compounds or alkylating agents for use in the process of the present invention. As stated, the process can be successfully applied to and utilized for conversion of olefin hydrocarbons when these olefin hydrocarbons are present in minor quantities in gas streams. Thus, in contrast to prior art processes, the normally gaseous olefin hydrocarbon for use in the process of the present invention, need not be purified or concentrated. Such normally gaseous olefin hydrocarbons appear in minor concentrations in various refinery gas streams, usually diluted with various unreactive gases such as hydrogen, nitrogen, methane, ethane, propane, etc. These gas streams containing minor quantities of olefin hydrocarbon are obtained in petroleum refineries from various refinery installations including thermal cracking units, catalytic cracking units, thermal reforming units, coking units, polymerization units, etc. Such refinery gas streams have in the past often been burned for fuel valve since an economical process for their utilization as alkylating agents or olefin-acting compounds has not been available except where concentration of the olefin hydrocarbons has been carried out concurrently therewith. This is particularly true for refinery gas streams containing relatively minor quantities of olefin hydrocarbons such as ethylene. Thus, it has been possible catalytically to polymerize propylene and/or various butenes in refinery gas streams but the off-gases from such processes still contain ethylene. Prior to our invention it has been necessary to purify and concentrate this ethylene or to use it for fuel. These refinery gas streams containing minor quantities of olefin hydrocarbons are known as off-gases. In addition to containing minor quantities of olefin hydrocarbons such as ethylene, propylene, and the various butenes, depending upon their source, they contain varying quantities of nitrogen, hydrogen, and various normally gaseous paraffinic hydrocarbons. Thus, a refinery off-gas ethylene stream may contain varying quantities of hydrogen, nitrogen, methane, and ethane with the ethylene in minor proportion, while a refinery off-gas propylene stream is normally diluted with propane and contains the propylene in minor quantities, and a refinery off-gas butene stream is normally diluted with butanes and contains the butenes in minor quantities. A typical analysis in mol percent for a utilizable refinery off-gas from a catalytic cracking unit is as follows: nitrogen, 4.0%; carbon monoxide, 0.2%; hydrogen, 5.4%; methane, 37.8%; ethylene, 10.3%; ethane, 24.7%; propylene, 6.4%; propane, 10.7%; and $C_4$ hydrocarbons, 0.5%. It is readily observed that the total olefin content of this gas stream is 16.7 mol percent and the ethylene content is even lower, namely 10.3 mol percent. Such gas streams containing olefin hydrocarbons in minor or dilute quantities are particularly preferred alkylating agents or olefin-acting compounds within the broad scope of the present invention. It is readily apparent that only the olefin content of such gas streams undergoes reaction in the process of this invention, and that the remaining gases free from olefin hydrocarbons are vented from the process.

In accordance with the process of the present invention, the alkylation of alkylatable aromatic hydrocarbons with olefin-acting compounds reaction to produce alkylated aromatic hydrocarbons of higher molecular weight than those charged to the process is effected in the presence of the above indicated catalyst at a temperature of from about 0° C. or lower to about 300° C. or higher, and preferably from about 20° C. to about 250° C., although the exact temperature needed for a particular aromatic hydrocarbon alkylation reaction will depend upon the alkylatable aromatic hydrocarbon and olefin-acting compound employed. The alkylation reaction is usually carried out at a pressure of from about substantially atmospheric to about 200 atmospheres. The pressure utilized is usually selected to maintain the alkylatable aromatic hydrocarbon in substantially liquid phase. Within the above temperature and pressure ranges, it is not always possible to maintain the olefin-acting compound in liquid phase. Thus, when utilizing a refinery off-gas containing minor quantities of ethylene, the ethylene will be dissolved in the liquid phase alkylatable aromatic hydrocarbon to the extent governed by temperature, pressure, and solubility considerations. However, a portion thereof undoubtedly will be in the gas phase. When possible, it is preferred to maintain all of the reactants in liquid phase. Such is not always possible, however, as set forth hereinabove. Referring to the aromatic hydrocarbon subjected to alkylation, it is preferable to have present from 2 to 10 or more, sometimes up to 20, molecular proportions of alkylatable aromatic hydrocarbon per one molecular proportion of olefin-acting compound introduced therewith to the alkylation zone. The higher molecular ratios of alkylatable aromatic hydrocarbon to olefin are particularly necessary when the olefin employed in the alkylation process is a high molecular weight olefin boiling generally higher than pentenes, since these olefins frequently undergo depolymerization prior to or substantially simultaneously with alkylation so that one molecular proportion of such olefin can thus alkylate two or more molecular proportions of the alkylatable aromatic hydrocarbon. The higher molecular ratios of alkylatable aromatic hydrocarbon to olefin also tend to reduce the formation of polyalkylated products because of the operation of the law of mass action under these conditions.

In converting aromatic hydrocarbons to effect alkylation thereof with the type of catalysts herein described, either batch or continuous operations may be employed. The actual operation of the process admits of some modification depending upon the normal phase of the reacting constituents, whether the catalyst utilized is not more than 2.5 grams of boron trifluoride per gram mol of olefin-acting compound along with a boron trifluoride modified silica-alumina, or said boron trifluoride modified silica-alumina alone, and whether batch or continuous operations are employed. In one type of batch operation, an aromatic hydrocarbon to be alkylated, for example benzene, is brought to a temperature and pressure within the approximate range specified in the presence of a catalyst comprising boron trifluoride and boron trifluoride modified substantially anhydrous silica-alumina having a concentration corresponding to a sufficiently high activity and alkylation of the benzene is effected by the gradual introduction under pressure of an olefin such as ethylene, in a manner to attain contact of the catalyst and reactants and in a quantity so that the amount of boron trifluoride utilized is from about 0.001 gram to about 2.5 grams per gram mol of olefin. After a sufficient time at the desired temperature and pressure, the gases, if any, are vented and the alkylated aromatic hydrocarbon separated from the reaction products.

In another manner of operation, the aromatic hydrocarbon may be mixed with the olefin at a suitable temperature in the presence of sufficient boron trifluoride modified silica-alumina, and boron trifluoride is then added to attain an amount between from about 0.001 gram to about 2.5 grams per gram mol of olefin. Then, reaction is induced by sufficiently long contact time with the catalyst. Alkylation may be allowed to progress to different stages depending upon contact time. In the case of the alkylation of benzene with normally gaseous olefins, the most desirable product is that obtained by the utilization in the process of molar quantities of benzene exceeding those of the olefin. In a batch type of operation, the amount of boron trifluoride modified silica-alumina utilized will range from about 1% to about 50% by weight based on the aromatic hydrocarbon. With this quantity of boron trifluoride modified silica-alumina, and boron trifluoride as set forth hereinabove, the contact time may be varied from about 0.1 to about 25 hours or more. Contact time is not only dependent upon the quantity of catalyst utilized but also upon the efficiency of mixing, shorter contact times being attained by increasing mixing. After batch treatment, the boron trifluoride component of the catalyst is removed in any suitable manner, such as by venting or caustic washing, the organic layer or fraction is decanted or filtered from the boron trifluoride modified silica-alumina, and the organic product or fraction is then subjected to separation such as by fractionation for the recovery of the desired reaction product or products.

In one type of continuous operation, a liquid aromatic hydrocarbon, such as benzene, containing dissolved therein the requisite amount of boron trifluoride, may be pumped through a reactor containing a bed of solid boron trifluoride modified silica-alumina. The olefin-acting compound may be added to the aromatic hydrocarbon stream prior to contact of this stream with the solid silica-alumina bed, or it may be introduced at various points in the silica-alumina bed, and it may be introduced continuously or intermittently, as set forth above. In this type of an operation, the hourly liquid space velocity of the aromatic hydrocarbon reactant will vary from about 0.25 to about 20 or more. The details of continuous processes of this general character are familiar to those skilled in the art of alkylation of aromatic hydrocarbons and any necessary additions or modifications of the above general procedures will be more or less obvious and can be made without departing from the broad scope of this invention.

The process of the present invention is illustrated by the following examples which are introduced for the purpose of illustration and with no intention of unduly limiting the generally broad scope of this invention.

*Example 1*

This example illustrates the fact that boron trifluoride alone, in the quantities herein disclosed, is not a catalyst for the alkylation of benzene with ethylene. The experiment carried out for this example was performed in a 850 milliliter knife edge closure rotatable high pressure autoclave. To this autoclave was added 270 milliliters (236 grams or 3 mols) of benzene, after which the autoclave was closed. Next, 2.1 grams of boron trifluoride was pressured into the autoclave. Then sufficient ethylene was added so that the pressure attained in the autoclave was 27 atmospheres. This amount of ethylene is approximately 1 molecular weight thereof, and in this particular case equaled 31.2 grams of ethylene. Thus the grams of BF₃ per gram mol of ethylene used was 2.1. The autoclave was then heated to 150° C., and heated and rotated at this temperature for 3 hours time.

At the expiration of this time, the autoclave was cooled and the pressure remaining thereon was released. After removal of the boron trifluoride and any unreacted ethylene, the liquid product was analyzed by infra-red diffraction techniques. The results of this analysis showed that the product contained 99.7 weight percent benzene and 0.3 weight percent ethylbenzene. This amount of ethylbenzene is equivalent to 0.7 gram. It is obvious from the above experiment that this amount of boron trifluoride alone is not a satisfactory catalyst for this reaction.

*Example II*

This example was carried out utilizing as the catalyst therefor a boron trifluoride modified substantially anhydrous silica-alumina, along with added boron trifluoride. The silica-alumina contained approximately equimolar quantities of silica and alumina. Prior to modification with boron trifluoride it was calcined for 31 hours at 650° C. This silica-alumina had a surface area of 315 square meters per gram, a pore volume of 0.437 cubic centimeter per gram, and a pore diameter of 55 Angstrom units. It apparently still contained about 5.25% water which was the weight loss experienced on heating the silica-alumina at 900° C.

A portion of the above silica-alumina was treated with boron trifluoride at 150° C. until boron trifluoride was observed in the effluent gases therefrom. After boron trifluoride modification, it contained 3.0% by weight of boron and 7.2% by weight of fluorine. It had an apparent bulk density of 0.594 gram per milliliter and its color was white.

A quantity of this boron trifluoride modified substantially anhydrous silica-alumina, in the amount of 100 milliliters, was placed in the rotating autoclave described in Example I. Next, 270 milliliters of benzene was aded and the autoclave closed. Then, 2.0 grams of boron trifluoride was pressured into the autoclave, after which the autoclave was pressured to 27 atmospheres with ethylene. The quantity of ethylene utilized here was 28 grams so that the ratio of BF₃ in grams to the gram mols of ethylene was 2.0. Here again, the autoclave was heated and rotated at 150° C. for 3 hours time.

After cooling, and removal of boron trifluoride and any unreacted ethylene from the liquid effluent, the liquid product was analyzed by infrared techniques. It was found to contain 73.4 weight percent benzene, 23.1 weight percent ethylbenzene, and 3.5 weight percent diethylbenzenes. These quantities are equivalent to the production of 59 grams of ethylbenzene and 8.9 grams of diethylbenzenes. These quantities of ethylbenzene and diethylbenzenes indicate substantial conversion of the ethylene to alkylated benzene hydrocarbons under the above conditions, in the presence of boron trifluoride modified substantially anhydrous silica-alumina and the indicated quantity of added boron trifluoride.

*Example III*

This example was carried out to illustrate the fact that still smaller quantities of boron trifluoride may be utilized along with a boron trifluoride modified substantially anhydrous silica-alumina, and that substantially complete conversion of ethylene to alkylated benzene hydrocarbons results therefrom. In this example, another sample of the same boron trifluoride modified substantially anhydrous silica-alumina as described in Example II was utilized.

To the same autoclave described in Example I, there was added another 100 milliliter sample of the boron trifluoride modified substantially anhydrous silica-alumina described in Example II. Next, 270 milliliters of benzene was aded to the autoclave folowing which the autoclave was closed. Then, 0.22 gram of boron trifluoride was pressured into the autoclave following which the autoclave was pressured to 27 atmospheres with ethylene. Since this amount of ethylene is approximately 1 molecular weight thereof, the number of grams of boron trifluoride per gram mol of ethylene was 0.22. Here again, the autoclave was rotated and heated at 150° C. for 3 hours time.

After cooling, and removal of boron trifluoride and unreacted ethylene, if any, the liquid product was analyzed by infra-red techniques. It was found to contain 66.8 weight percent benzene, 23.1 weight percent ethylbenzene, and 10.1 weight percent of diethylbenzenes. This is equivalent to the production of 60.8 grams of ethylbenzene and 26.6 grams of diethylbenzenes. These quantities of ethylbenzene and diethylbenzenes are equivalent to substantial conversion of ethylene to alkylated benzene hydrocarbons under the conditions utilized in the presence of a boron trifluoride modified substantially anhydrous silica-alumina along with a small quantity of added boron trifluoride.

We claim as our invention:

1. A process for the production of an alkylaromatic hydrocarbon which comprises passing to an alkylation zone maintained at alkylation conditions and containing boron trifluoride modified substantially anhydrous silica-alumina, alkylatable aromatic hydrocarbon, a refinery gas stream containing a minor proportion of olefin, and a major proportion of gaseous components which are inert under said conditions, and from about 0.001 gram to about 2.5 grams of boron trifluoride per gram mol of olefin, reacting therein said alkylatable aromatic hydrocarbon with said olefin contained in the refinery gas stream in the presence of an alkylation catalyst comprising said boron trifluoride and boron trifluoride modified silica-alumina, and recovering therefrom alkylated aromatic hydrocarbon.

2. A process for the production of an alkylbenzene hydrocarbon which comprises passing to an alkylation zone maintained at alkylation conditions and containing boron trifluoride modified substantially anhydrous silica-alumina, alkylatable benzene hydrocarbon, a refinery gas stream containing a minor proportion of olefin and a major proportion of gaseous components which are inert under said conditions, and from about 0.001 gram to about 2.5 grams of boron trifluoride per gram mol of olefin, reacting therein said alkylatable benzene hydrocarbon with said olefin contained in the refinery gas stream in the presence of an alkylation catalyst comprising said boron trifluoride and boron trifluoride modified silica-alumina, and recovering therefrom alkylated benzene hydrocarbon.

3. A process for the production of ethylbenzene which comprises passing to an alkylation zone maintained at alkylation conditions and containing boron trifluoride modified substantially anhydrous silica-alumina, benzene, a refinery gas stream containing a minor proportion of ethylene and a major proportion of gaseous components which are inert under said conditions, and from about 0.001 gram to about 2.5 grams of boron trifluoride per gram mol of ethylene, reacting therein said benzene with said ethylene contained in the refinery gas stream in the presence of an alkylation catalyst comprising said boron trifluoride and boron trifluoride modified silica-alumina, and recovering therefrom ethylbenzene.

4. A process for the production of cumene which comprises passing to an alkylation zone maintained at alkylation conditions and containing boron trifluoride modified substantially anhydrous silica-alumina, benzene, a refinery gas stream containing a minor proportion of propylene and a major proportion of gaseous components which are inert under said conditions, and from about 0.001 gram to about 2.5 grams of boron trifluoride per gram mol of propylene, reacting therein said benzene with said propylene contained in the refinery gas stream in the presence of an alkylation catalyst comprising said boron trifluoride and boron trifluoride modified silica-alumina, and recovering therefrom cumene.

5. A process for the production of butylbenzene which comprises passing to an alkylation zone maintained at alkylation conditions and containing boron trifluoride modified substantially anhydrous silica-alumina, benzene, a refinery gas stream containing a minor proportion of a butene and a major proportion of gaseous components which are inert under said conditions, and from about 0.001 gram to about 2.5 grams of boron trifluoride per gram mol of butene, reacting therein said benzene with said butene contained is the refinery gas stream in the presence of an alkylation catalyst comprising said boron trifluoride and boron trifluoride modified silica-alumina, and recovering therefrom butylbenzene.

References Cited in the file of this patent

UNITED STATES PATENTS

| | | |
|---|---|---|
| 2,380,234 | Hall | July 10, 1945 |
| 2,804,491 | May et al. | Aug. 27, 1957 |

FOREIGN PATENTS

| | | |
|---|---|---|
| 1,028,700 | France | May 27, 1953 |